(12) United States Patent
Riefe et al.

(10) Patent No.: US 7,063,354 B2
(45) Date of Patent: Jun. 20, 2006

(54) LINEAR TRACKING COLUMN MODULE

(75) Inventors: Richard K. Riefe, Saginaw, MI (US); Bruce M. Collier, Saginaw, MI (US); Richard P. Nash, Frankenmuth, MI (US); Minoo J. Shah, Farmington Hills, MI (US); Alan C. Davis, Fenton, MI (US); Frederick J. Berg, Auburn, MI (US); Ronald H. Dybalski, Oxford, MI (US); Jason R. Ridgway, Bay City, MI (US); Paul E. Balius, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 198 days.

(21) Appl. No.: 10/767,988

(22) Filed: Jan. 29, 2004

(65) Prior Publication Data

US 2004/0239090 A1    Dec. 2, 2004

Related U.S. Application Data

(60) Provisional application No. 60/473,787, filed on May 28, 2003, provisional application No. 60/447,060, filed on Feb. 13, 2003, provisional application No. 60/444,297, filed on Jan. 31, 2003.

(51) Int. Cl.
*B62D 1/19* (2006.01)
(52) U.S. Cl. .................................... 280/777; 74/493
(58) Field of Classification Search ............... 280/771, 280/775, 776, 777, 779, 748, 750; 74/493, 74/512; 180/315; B62D 01/19
See application file for complete search history.

(56) References Cited

U.S. PATENT DOCUMENTS

| | | |
|---|---|---|
| 3,964,578 A | 6/1976 | Campbell et al. |
| 4,738,469 A | 4/1988 | Ushijima et al. |
| 4,875,385 A | 10/1989 | Sitrin |
| 4,949,590 A | 8/1990 | Barker et al. |
| 5,010,782 A | 4/1991 | Asano et al. |
| 5,037,130 A | 8/1991 | Okuyama |
| 5,086,663 A | 2/1992 | Asano et al. |
| 5,181,435 A | 1/1993 | Khalifa et al. |
| 5,259,646 A | 11/1993 | Snyder |
| 5,632,507 A | 5/1997 | Sinner et al. |
| 5,685,564 A | 11/1997 | Iijima et al. |
| 5,778,732 A | 7/1998 | Patzelt et al. |
| 6,076,422 A | 6/2000 | Tabata |
| 6,149,196 A * | 11/2000 | Guiard et al. ............... 280/777 |
| 6,151,984 A | 11/2000 | Johansson et al. |
| 6,152,488 A | 11/2000 | Hedderly et al. |
| 6,170,874 B1 | 1/2001 | Fosse |
| 6,173,625 B1 | 1/2001 | McFarlane et al. |
| 6,220,630 B1 | 4/2001 | Sundholm et al. |
| 6,241,284 B1 | 6/2001 | De Verdier et al. |
| 6,283,508 B1 * | 9/2001 | Nouwynck et al. ......... 280/753 |
| 6,305,239 B1 | 10/2001 | Johansson et al. |

(Continued)

*Primary Examiner*—Paul N. Dickson
*Assistant Examiner*—Tiffany Webb
(74) *Attorney, Agent, or Firm*—Michael D. Smith

(57) ABSTRACT

A collapsible steering assembly features a guide bracket for attachment to a vehicle. A steering mechanism is interconnected with the guide bracket by a steering mechanism support. A plurality of guide rods are arranged about a common collapse axis and extend in non-parallel relationship to a longitudinal axis of the steering mechanism. The guide rods support the steering mechanism for axial movement along the collapse axis in response to a predetermined collapse force on the steering mechanism.

21 Claims, 6 Drawing Sheets

U.S. PATENT DOCUMENTS

| | | |
|---|---|---|
| 6,374,695 B1 | 4/2002 | Johansson et al. |
| 6,375,220 B1 | 4/2002 | Kamm |
| 6,382,670 B1 | 5/2002 | Badaire et al. |
| 6,581,966 B1 | 6/2003 | Mendis |
| 6,619,155 B1 | 9/2003 | Brock |
| 6,644,690 B1 | 11/2003 | Brownlee et al. |
| 2001/0035640 A1 | 11/2001 | Cappabianca et al. |
| 2002/0089160 A1 | 7/2002 | Mendis |
| 2003/0001372 A1 | 1/2003 | Browne et al. |
| 2003/0025314 A1 | 2/2003 | Figlioli et al. |
| 2003/0052481 A1 | 3/2003 | Yang |
| 2003/0122359 A1 | 7/2003 | Pardonnet |
| 2004/0046379 A1* | 3/2004 | Riefe .......................... 280/777 |

* cited by examiner

LINEAR TRACKING COLUMN MODULE

CROSS-REFERENCES TO RELATED APPLICATIONS

This Application claims the benefit of U.S. Provisional Patent Application No. 60/447,060 filed on Feb. 13, 2003, and U.S. Provisional Patent Application No. 60/444,297 filed on Jan. 31, 2003.

FIELD OF THE INVENTION

The subject invention relates to a vehicle steering assembly having components movable in response to a crash condition.

BACKGROUND OF THE INVENTION

Collapsible steering column assemblies are well known in the art. Such assemblies typically include an energy-absorbing bracket or other support affixed to the body of a vehicle. Steering column components including, but not limited to a steering wheel and shaft are carried by the support. Should a collision occur in which a sufficiently large impact force is applied to the steering wheel, the steering column and wheel will collapse relative to the support and translate away from the driver of the vehicle.

The collapse of the column typically takes place along the axis of the column, which may not correspond to a preferred collapse path, but for design limitations of the column. A column assembly constructed according to the present invention overcomes the limitations of the prior columns in a form that is both readily adaptable to particular design requirements of a given application and is robust.

SUMMARY OF THE INVENTION AND ADVANTAGES

The present invention provides a collapsible steering assembly including a stationary guide bracket for attachment to a vehicle and a steering mechanism having a longitudinal axis. The assembly also features a steering mechanism support with a plurality of guide rods arranged about a common collapse axis. The guide rods not only interconnect the guide bracket and the steering mechanism, but also support the steering mechanism for axial movement along the collapse axis in response to application of a predetermined collapse force to the steering mechanism.

The subject invention addresses the shortcomings of the prior assemblies through the provision of guide rods which interconnect the steering mechanism and associated guide bracket with a steering mechanism support, providing a modular, robust assembly which enables the steering mechanism to be supported during normal operation about one axis best suited for operation of the steering mechanism, while further supporting the assembly for collapse along a collapse path different than that of the steering mechanism axis. In a crash event, the steering mechanism moves simultaneously with the guide rods relative to the guide bracket to enable the steering mechanism to collapse along the collapse path other than that of the axis of the steering mechanism. In particular, the guide rods are preferably oriented independently of the axis of the steering mechanism to cause the steering mechanism to collapse in a direction corresponding to an ideal trajectory path of the upper torso of a driver in a collision to maximize the energy absorbed by the assembly. The guide rods are also preferably spaced from one another to provide a stable framework that resists any bending or deformation of the support structure during collapse.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
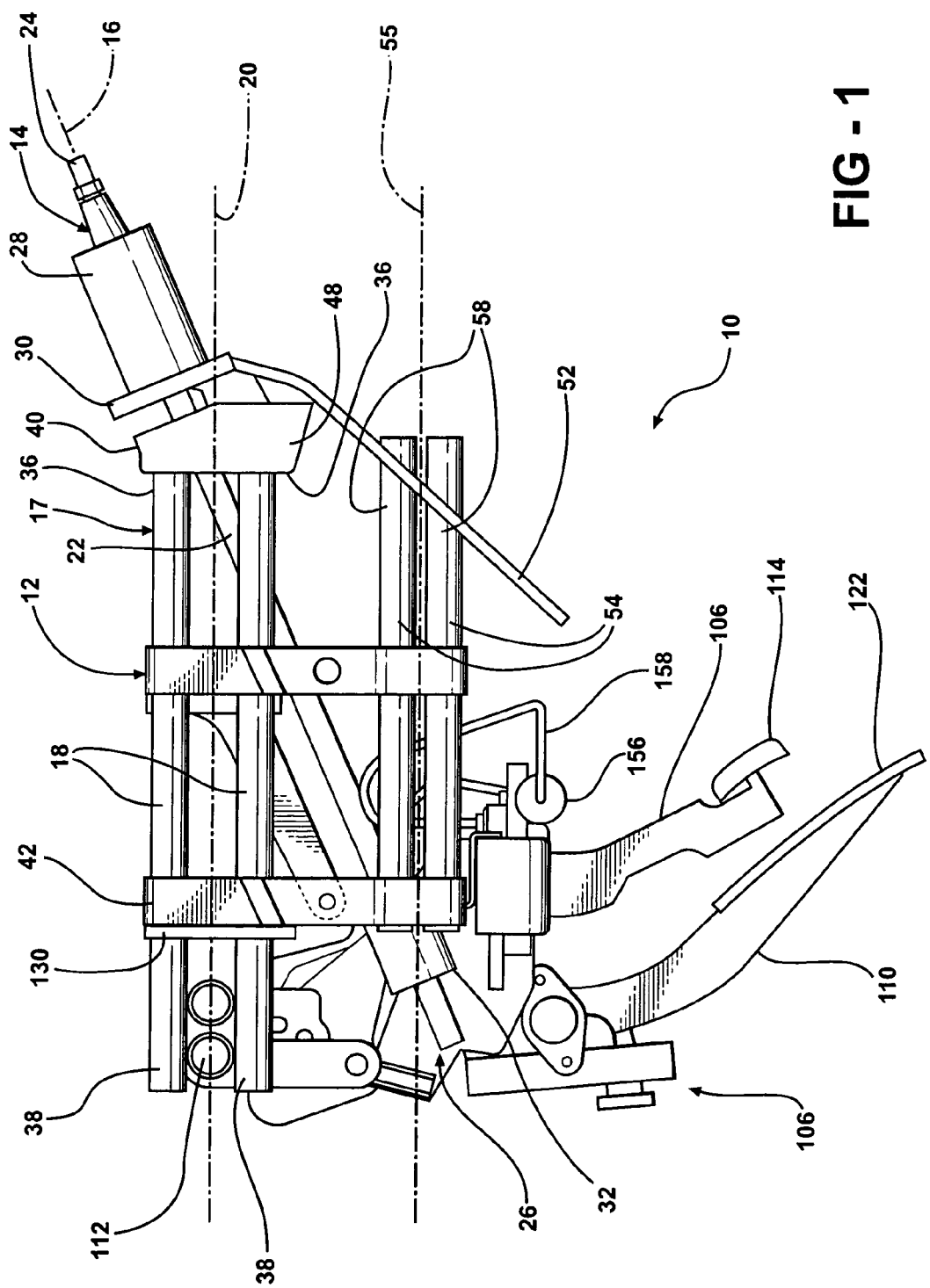
FIG. 1 is a side view of a collapsible steering assembly according to an embodiment of the present invention.

Referring to the Figures, wherein like numerals indicate like or corresponding parts throughout the several views, a collapsible steering assembly is generally shown at 10 in FIG. 1. The assembly 10 includes a stationary guide bracket 12 for attachment to a vehicle and a steering mechanism 14 having a longitudinal steering mechanism axis 16. The assembly 10 also includes a steering mechanism support 17 with a plurality of guide rods 18. The guide rods 18 are arranged about a common collapse axis 20 in non-parallel relationship to the steering mechanism axis 16, and interconnect the guide bracket 12 and the steering mechanism 14. The guide rods 18 also support the steering mechanism 14 for axial movement along the collapse axis 20 in response to application of a predetermined collapse force to the steering mechanism 14.

The steering mechanism 14 includes a steering shaft 22. The shaft 22 extends coaxially with the steering mechanism axis 16 between upper and lower ends 24 and 26. An upper bearing housing 28 and a rake bracket 30 are coaxially disposed about the shaft 22 adjacent the upper end 26. A lower bearing housing 32 is coaxially disposed about the shaft 22 adjacent the lower end 24.

Although the steering mechanism 14 shown in FIG. 1 comprises a conventional steering column with a shaft 22, those skilled in the art will appreciate that the steering mechanism 14 used in the assembly 10 need not be limited to one utilizing a traditional column structure. The steering mechanism 14 may, for example, comprise a steer-by-wire system which may or may not include a mechanical steering linkage such as the shaft 22.

The assembly 10 also includes a plurality of steering shear elements 34 that interconnect the guide rods 18 and the guide bracket 12. The shear elements 34 operate to prevent movement of the steering mechanism 14 relative to the guide bracket 12 during normal useage of the assembly 10, but are shearable in response to application of the predetermined collapse force on the steering mechanism 14 to enable the guide rods 18 and the steering mechanism 14 to move relative to the guide bracket 12 along the collapse axis 20. The guide bracket 12 supports the guide rods 18 in fixed relationship to one another, which in turn permits collective movement of the guide rods 18 relative to the guide bracket 12 in response to the predetermined collapse force on the steering mechanism 14.

Although each of the guide rods 18 may have any suitable shape, each guide rod 18 shown in FIG. 1 is preferably straight and comprises a steering tube having a front end 36 and a rear end 38. Although any number of guide rods, or steering tubes, 18 may be utilized and arranged in any suitable configuration relative to the guide bracket 12, the guide rods 18 of the present invention preferably include four tubes spaced from one another in a quadrangle.

A front bracket 40 interconnects the front ends 36 of the guide rods 18, and a rear bracket 42 supports the rear ends 38 of the guide rods 18 and the steering mechanism 14. The front and rear brackets 40 and 42 are spaced on opposite sides of the guide bracket 12, such that the guide bracket 12 is located along the guide rods 18 between the front and rear brackets 40 and 42.

A second plurality of steering shear elements 34 interconnect the rear bracket 42 and the guide rods 18. The steering shear elements 34 normally prevent movement of the guide rods 18 relative to the rear bracket 42, but shear in response to application of the predetermined collapse force to the steering mechanism 14 for allowing the guide rods 18 to move through the rear bracket 42 in the same manner as the shear elements associated with the guide bracket 12. The rear ends 38 of the guide rods 18 preferably extend through the rear bracket 42.

Figure 2:
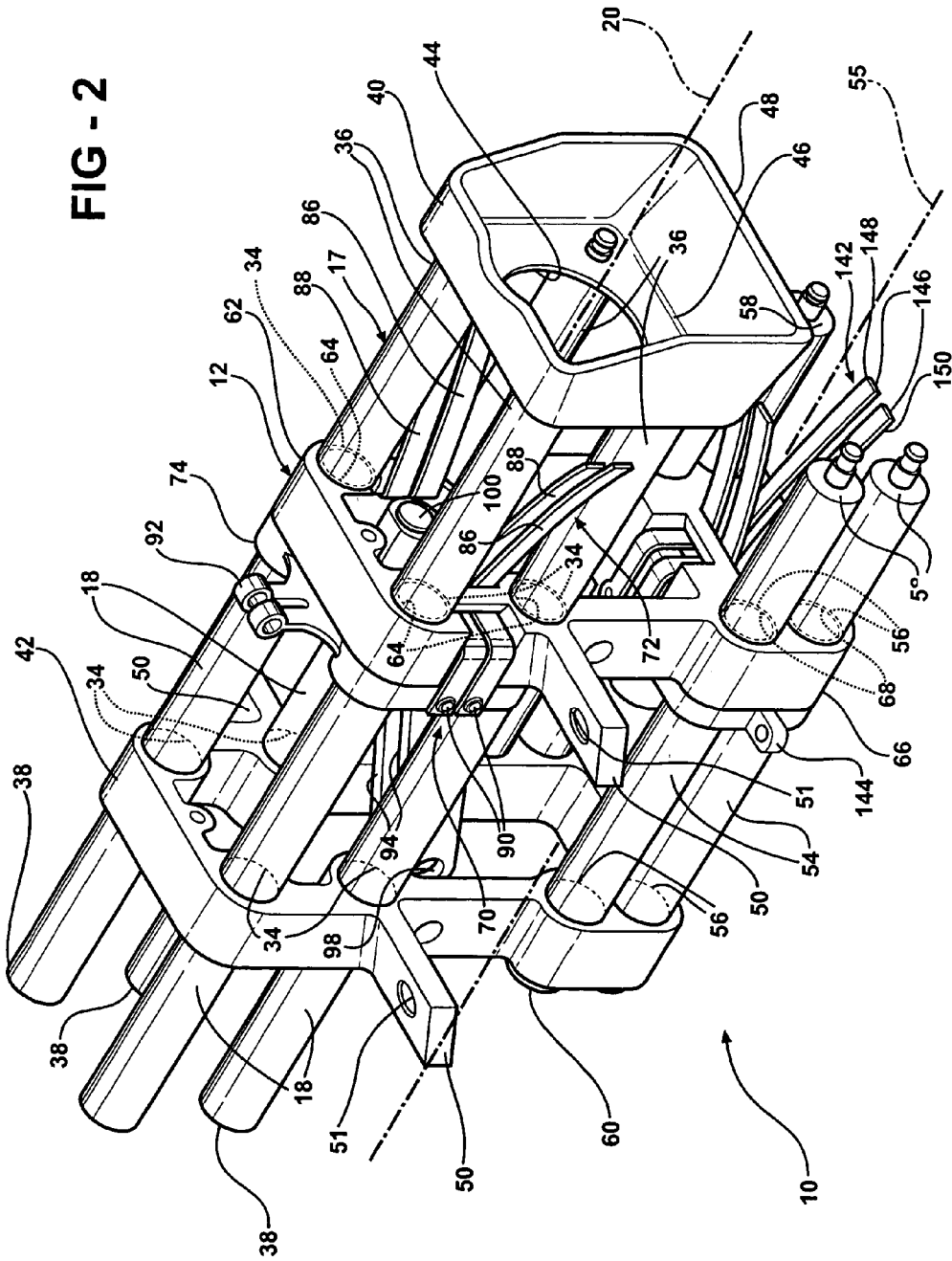
FIG. 2 is a front perspective view of the collapsible steering assembly shown in FIG. 1 with the steering assembly, knee bolster and pedal assembly removed.
Figure 3:
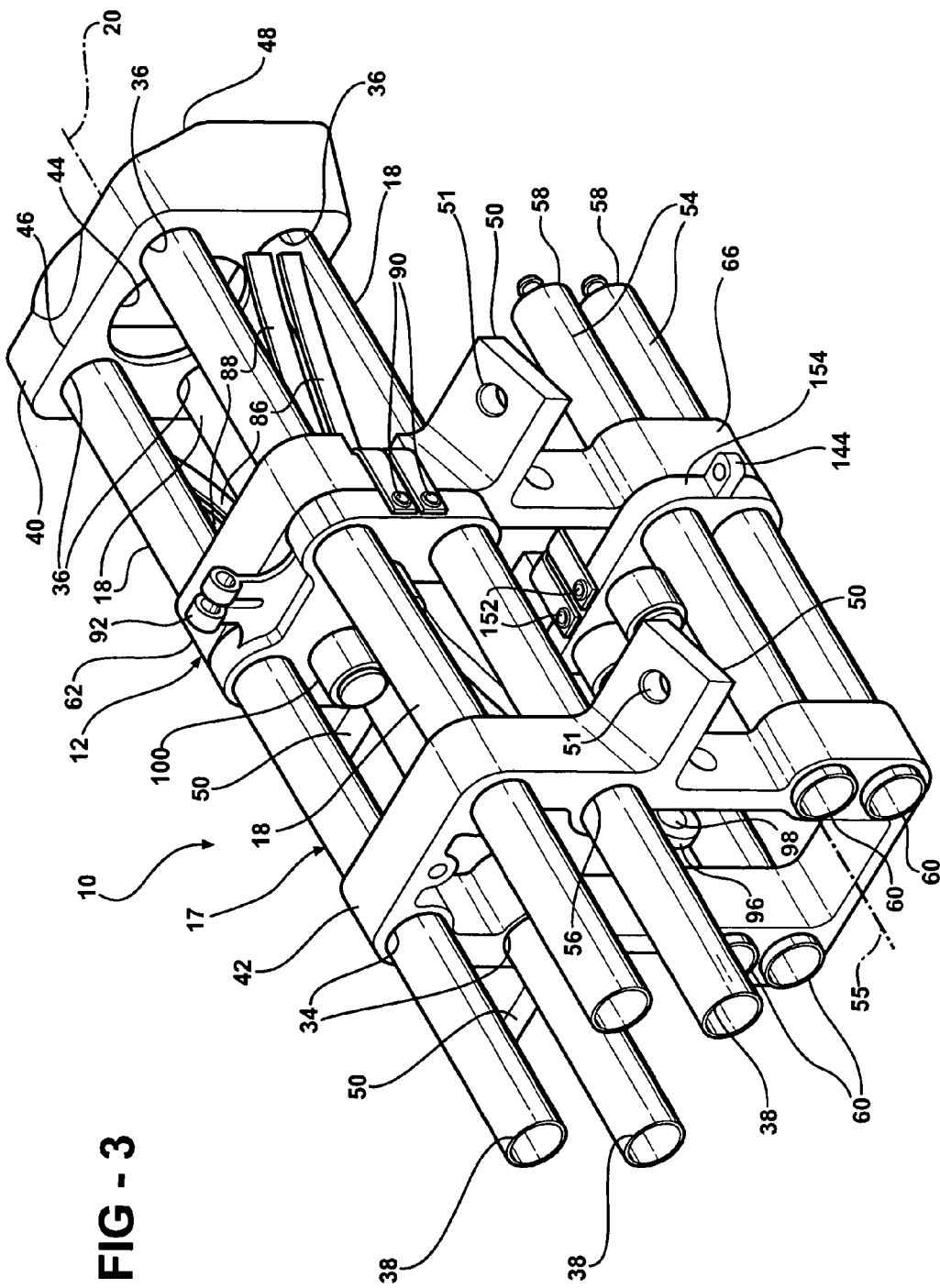
FIG. 3 is a rear perspective view of the collapsible steering assembly shown in FIG. 2.

Referring in particular to FIG. 2, the front bracket 40 includes a central opening 44 and a peripheral edge 46 from which a collar 48 extends. The upper end 24 of the steering shaft 22, the upper bearing housing 28, and the rake bracket 30 extend through the opening 44. The lower end 26 of the steering shaft 22 extends beyond the rear bracket 42, such that the front bracket 40, guide bracket 12 and rear bracket 42 are spaced along the steering shaft 22 between the upper and lower ends 24 and 26. The rear bracket 42 includes at least one and preferably two connectors 50 for attachment to the vehicle. The guide bracket 12 likewise includes at least one and preferably two connectors 50 for attachment to the vehicle. Each connector 50 may be formed with a hole 51 or other feature for receiving a fastening bolt (not shown) to permit attachment to the vehicle.

The assembly 10 also includes a knee bolster 52 for absorbing impact energy during a crash condition. A plurality of bolster guide rods 54 are arranged about a second collapse axis 55 and interconnect the guide bracket 12 and the knee bolster 52. The bolster guide rods 54 support the knee bolster 52 for axial movement along the second collapse axis 55 in response to application of a second predetermined collapse force to the knee bolster 52. A plurality of bolster shear elements 56 interconnect the bolster guide rods 54 and the guide bracket 12. The bolster shear elements 56 prevent the knee bolster 52 from moving relative to the guide bracket 12 during normal operation but are operative to shear in response to application of an applied collapse force to the knee bolster 52 sufficient to overcome the holding force of the shear elements 56, which in turn allows the bolster guide rods 54 and the knee bolster 52 to move relative to the guide bracket 12 in a collapse event.

The guide bracket 12 supports the bolster guide rods 54 in fixed relationship to one another, which in turn permits collective movement of the bolster guide rods 54 relative to the guide bracket 12. While each of the bolster guide rods 54 may have any suitable shape, each bolster guide rod 54 is preferably straight and comprises a tube having a front end 58 and a rear end 60. Any number of bolster guide rods, or bolster tubes, 54 may be utilized and arranged in any suitable configuration relative to the guide bracket 12. However, the bolster tubes 54 of the present invention preferably include four such tubes spaced from one another in a quadrangle.

The guide bracket 12 includes an upper block 62 having bores 64 therethrough. The guide rods 18 extend through the bores 64. The guide bracket 12 also includes a lower block 66 having bores 68 therethrough. The bolster tubes 54 extend through the bores 68 in the lower block 66.

While any appropriate shearable device may be used, the steering shear elements 34 and bolster shear elements 56 of the present invention preferably comprise bushings. Each bushing is interposed between one of the rods 18 or 54 and one of either the guide bracket 12 or the rear bracket 42 and has a detent or other feature which maintains the rod 18 or 54 in a fixed position relative to the guide bracket 12 or the rear bracket 42 during normal operation. Upon application of a sufficient collapse force to the steering mechanism 22 or knee bolster 52, the detents or other features on the bushings maintaining the linkage between the guide bracket 12 or the rear bracket 42 and the respective rods 18 or 54 will be broken, or "shear", which not only overcomes the holding force on, but also releases the tubes 18 or 54 for movement relative to the guide bracket 12 or rear bracket 42.

The bolster tubes 54 of the assembly 10 are disposed in at least one pair on either side of the guide rods 18. The bolster tubes 54 are also disposed parallel to the guide rods 18. Two pairs of bolster tubes 54 are disclosed, and each pair extends through the bores 68 in the lower block 66. The rear ends 60 of the bolster tubes 54 are supported by the rear bracket 42. Disposing the bolster tubes 54 outside the guide rods 18 permits the knee bolster 52 to collapse without interfering with or otherwise initiating a simultaneous or subsequent collapse of the guide rods 18 and steering mechanism 14.

Figure 4:
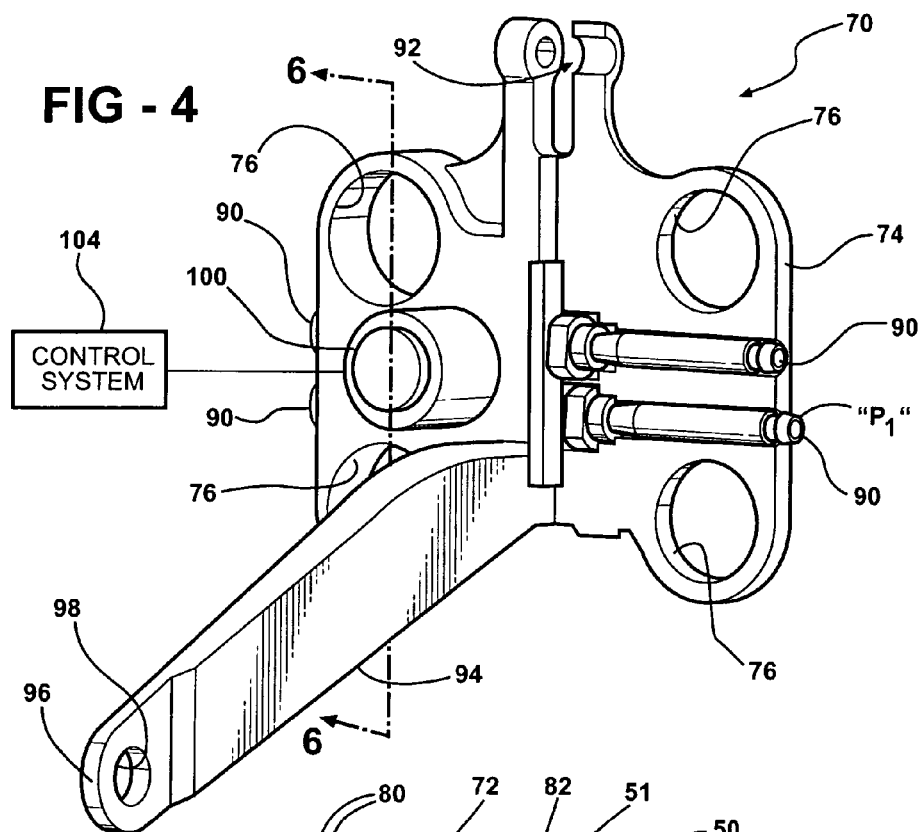
FIG. 4 is a perspective view of the release bracket and lower bearing housing support utilized in the collapsible steering assembly with one arm of the lower bearing housing support removed.
Figure 5:
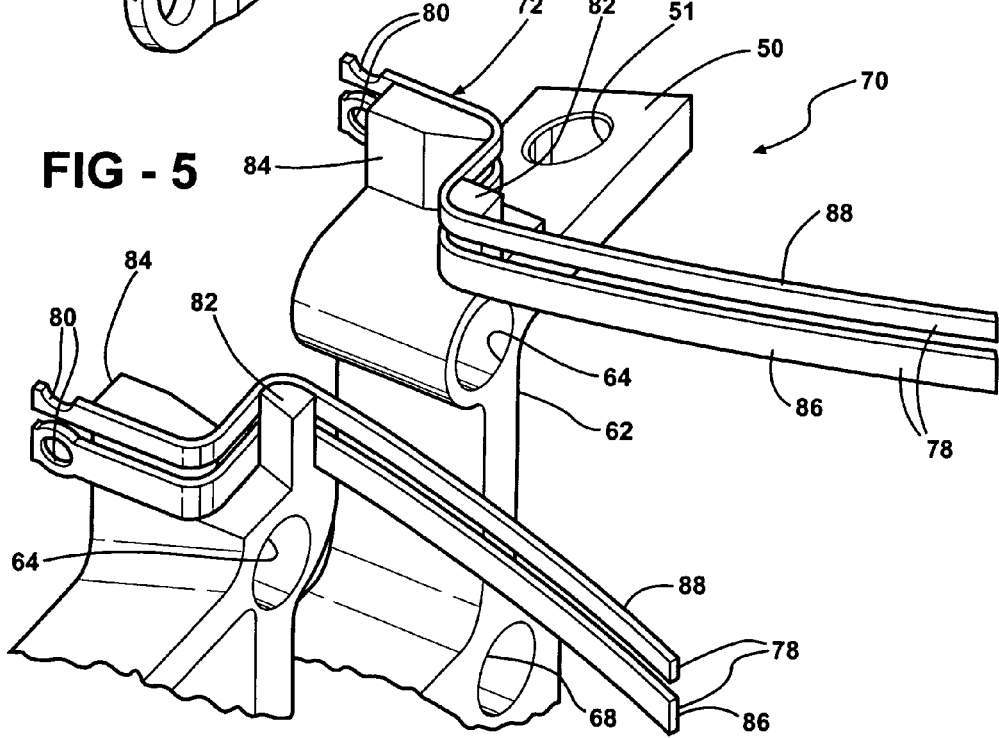
FIG. 5 is a partial perspective view of the upper block and pairs of high force and low-force straps of one of the anvil-strap devices utilized in the steering assembly.

As is best shown in FIGS. 4 and 5, the assembly 10 also includes an energy absorber system 70 for absorbing energy during movement of the steering mechanism 14 and knee bolster 52 relative to the guide bracket 12. The energy absorber system 70 includes a first anvil-strap device 72 interconnecting the steering tubes 18 and upper block 62. The first anvil-strap device 72 includes a release bracket 74 with bores 76 therethrough. As is shown in FIG. 2, the release bracket 74 is disposed in engagement with the upper block 62. The guide rods 18 extend through the bores 76 and are carried by the release bracket 74 in fixed relation to one another. The at least one and preferably two pair of plastically-deformable straps 78 with holes 80 therethrough are disposed in frictional and bending engagement with respective pairs of first and second anvils 82 and 84. The straps 78 interconnect the release bracket 74 with the upper block 62. Each pair of straps 78 includes a high-force strap 86 and a low-force strap 88 extending in parallel relation to one another from the release bracket 74. Retaining pins 90 are disposed within the release bracket 74. Each pin 90 extends through one of the holes 80 and interconnects the associated strap 86 or 88 with the release bracket 74. The pins 90 may alternatively be disposed within the upper block 62 for securing the straps 86 and 88 with the upper block 62.

The first anvil-strap device 72 is a variable energy absorbing system that utilizes pairs of S-straps, i.e., straps deformed in the shape of the letter "S", having variable widths. However, one skilled in the art will appreciate that other energy absorbing devices may be used, including but not limited to those which employ one or more M-straps, J-straps, ,i.e., deformed in the shape of the letters "M" or "J", other straps, wires, pyrotechnic or other actuating devices, or a combination thereof.

Figure 6:
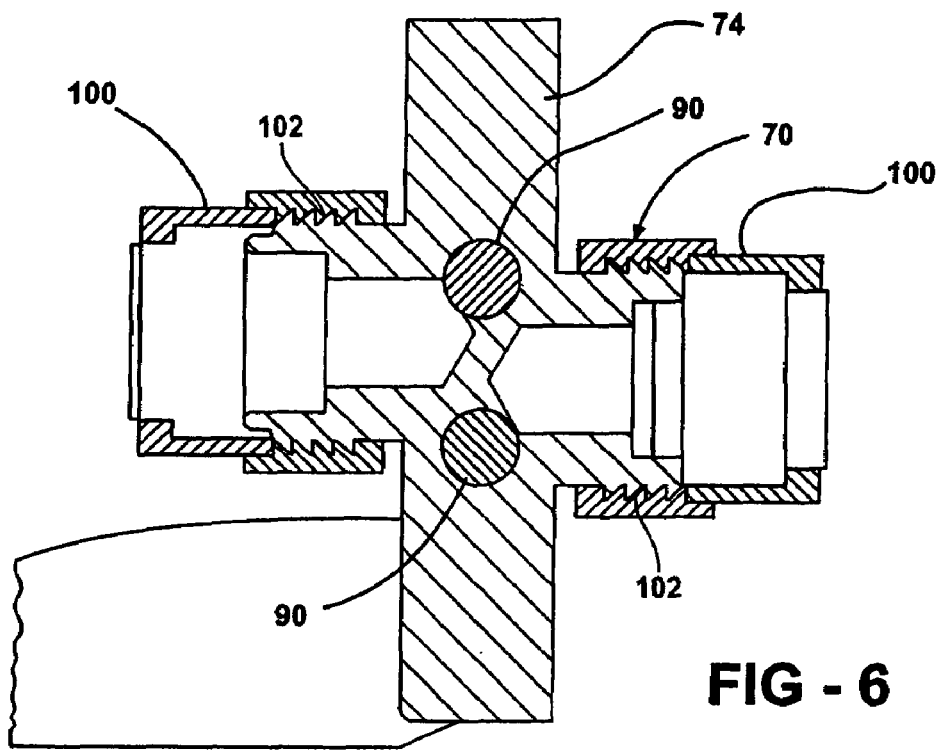
FIG. 6 is a partial cross-sectional view of a pair of pyrotechnic devices and pyrotechnic pins utilized in the anvil-strap device shown in FIG. 4.

Referring specifically to FIG. 6, the first anvil strap device 72 also includes actuating devices 100, which are disposed upon threaded bosses 102 that extend from the release bracket 74. Each actuating device 100 engages one of the pins 90 and selectively discharges for actuating movement of the pin 90 to a discharged position "$P_1$", such as that which is shown in FIG. 4. This alters the frictional and/or bending or resistance force generated by the strap 86 or 88 associated with the pin 90 as the straps 86 and 88 move across the anvils 82 and 84, respectively, to correspondingly alter the energy absorbing characteristics of the energy absorber system 70. Each pair of anvils 82 and 84 displaces a portion of the pair of straps 86 and 88 associated therewith and imposes a reaction force thereon to absorb energy as each pair of the straps 86 and 88 move past the respective pairs of anvils 82 and 84.

Although any suitable actuating device may be utilized, the preferred actuating device 100 comprises an electrically activated pyrotechnic device. A control system such as that which is schematically depicted at 104 in FIG. 4 is operatively connected to the devices 100. The control system 104 monitors and detects variable components affected by the crash condition, determines the amount of energy to be absorbed, and transmits a signal corresponding to that amount to the actuating devices 100, which in turn actuates one or more of the devices 100 to modify the energy absorbing characteristics in accordance with the requirements of a particular crash event. For example, during a crash condition in which a large predetermined collapse force is applied to the assembly 10, none of the actuating devices 100 would be discharged in order to maximize the energy absorbing forces between the pairs of straps 86 and 88 and respective anvils 82 and 84. Under less severe, moderate conditions, the actuating devices 100 may initiate release of the low-force straps 88 to provide corresponding reduced energy absorbing characteristics of the system 104. Under still lesser crash conditions, the actuating devices 100 may respond to by initiating release of the high-force straps 86 to produce a correspondingly reduced energy absorbing characteristic of the system 104.

Referring again to FIG. 2, the energy absorber system 70 also includes a second anvil strap device 142 associated with the knee bolster 52. The second anvil strap device 142 includes many of the same components and functions in the same manner as the first anvil-strap device 72. However, in contrast to the first anvil-strap device 72, the second anvil-strap device 142 includes a release bracket 144 which disposed against the lower block 66 during normal operation. The bolster tubes 54 are carried by the release bracket 144 in fixed relation to one another. A pair of energy absorbing straps 146 interconnect the release bracket 144 with the lower block 66. However, rather than being secured to opposing sides of the release bracket 144, the high and low-force straps 148 and 150 of the pair 146 are secured by retaining pins 152 to the upper surface 154 of the release bracket 144. The pins 152 will release one or both of the straps 148 and 150 upon being actuated in response to a signal transmitted from the control system 104 to absorb energy in response to application of the predetermined collapse force on the knee bolster 52. One skilled in the art will recognize that any other suitable energy-absorbing device or devices may be used in place of the second anvil-strap device 142.

A hinge assembly 92 extends from the release bracket 74. The hinge assembly 92 may be used for attaching an optional display screen or other control device (not shown) to the assembly 10. A lower bearing housing support 94 is also disposed on the release bracket 74. The support 94 has two arms that extend at an angle from the release bracket 74 to a connecting end 96 through which a hole 98 extends. A pivot pin (not shown) is disposed through the hole 98 and engages the lower bearing housing 94 for permitting pivotal movement of the steering mechanism 14 relative to the guide bracket 12.

Figure 7:
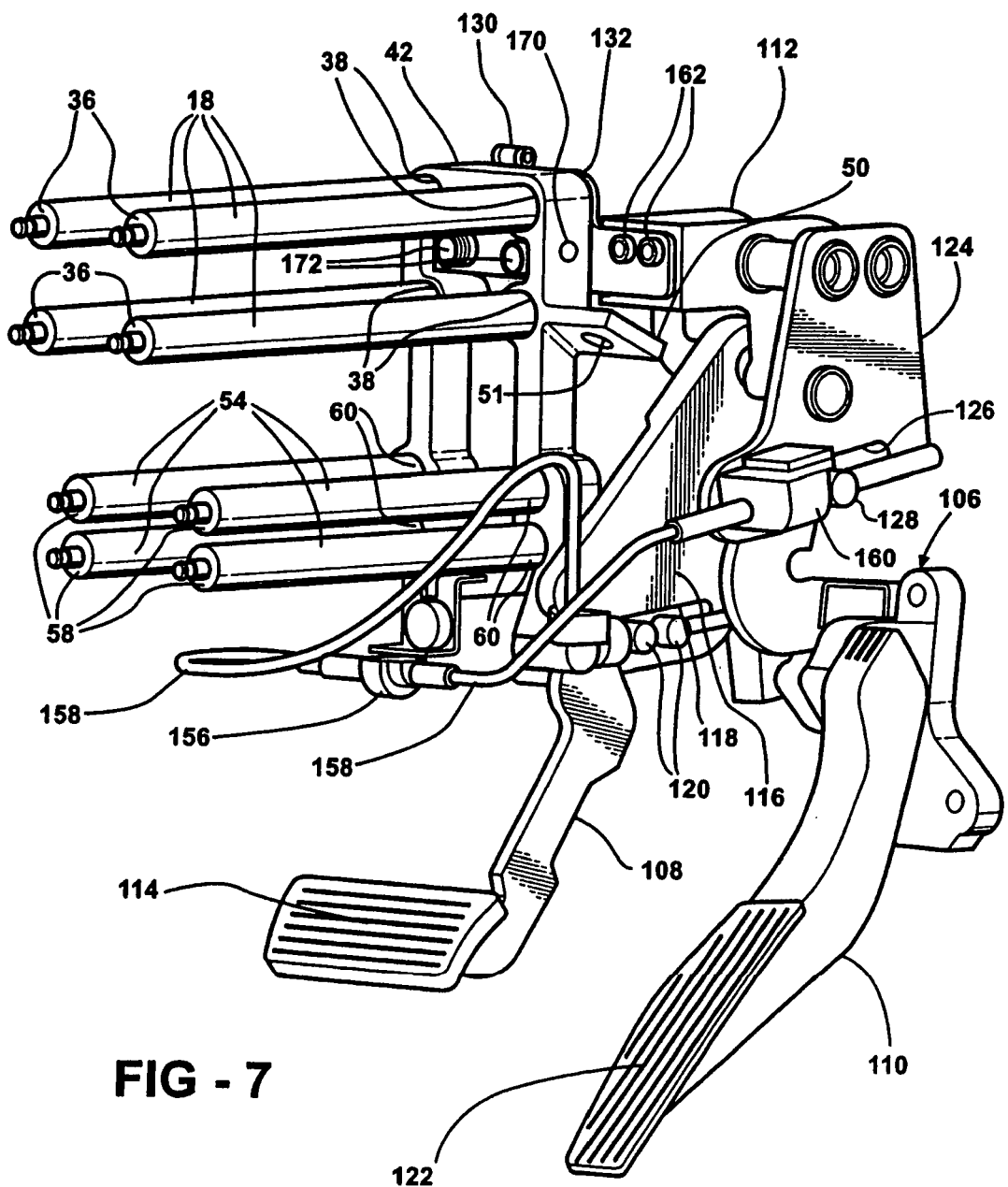
FIG. 7 is a perspective view of the pedal assembly, steering tubes and bolster tubes of the collapsible steering assembly.

The assembly 10 also includes a pedal assembly, which is generally shown at 106 in FIG. 7. The pedal assembly 106 is pivotally connected to the rear bracket 42 for pivotal movement in response to movement of the guide rods 18 relative to the rear bracket 42. The pedal assembly 106 includes a brake assembly 108 and a throttle assembly 110. A mounting assembly 112 interconnects the brake and throttle assemblies 108 and 110 with the rear bracket 42.

The brake assembly 106 includes a brake pedal 114. A first bracket 116 interconnects the brake pedal 114 and the mounting bracket 112. The first bracket 116 includes a slot 118. Adjustment fasteners 120 adjustably mount the brake pedal 114 in the slot 118 for permitting adjustment of the position of the brake pedal 114 relative to the first bracket 116.

The throttle assembly 110 includes a throttle pedal 122. A second bracket 124 interconnects the throttle pedal 122 and the mounting bracket 112. An adjustment fastener 128 adjustably mounts the throttle pedal 122 in the a slot 126 for adjusting the throttle pedal 122 relative to the second bracket 124. The pedal assembly 106 also includes a hinge assembly 130 that interconnects the mounting bracket 112 and the rear bracket 42 and permits pivotal movement of the pedal assembly 106. The hinge assembly 130 features a bifurcated bracket 132 that carries the mounting bracket 112.

Referring again to FIG. 7, the pedal assembly 106 also includes a motor 156 having drive cables 158 operatively connected to at least one pedal actuator 160 carried by the mounting assembly 112. The pedal actuator 160 selectively actuates movement of the brake and throttle assemblies 108 and 110.

Figure 8:
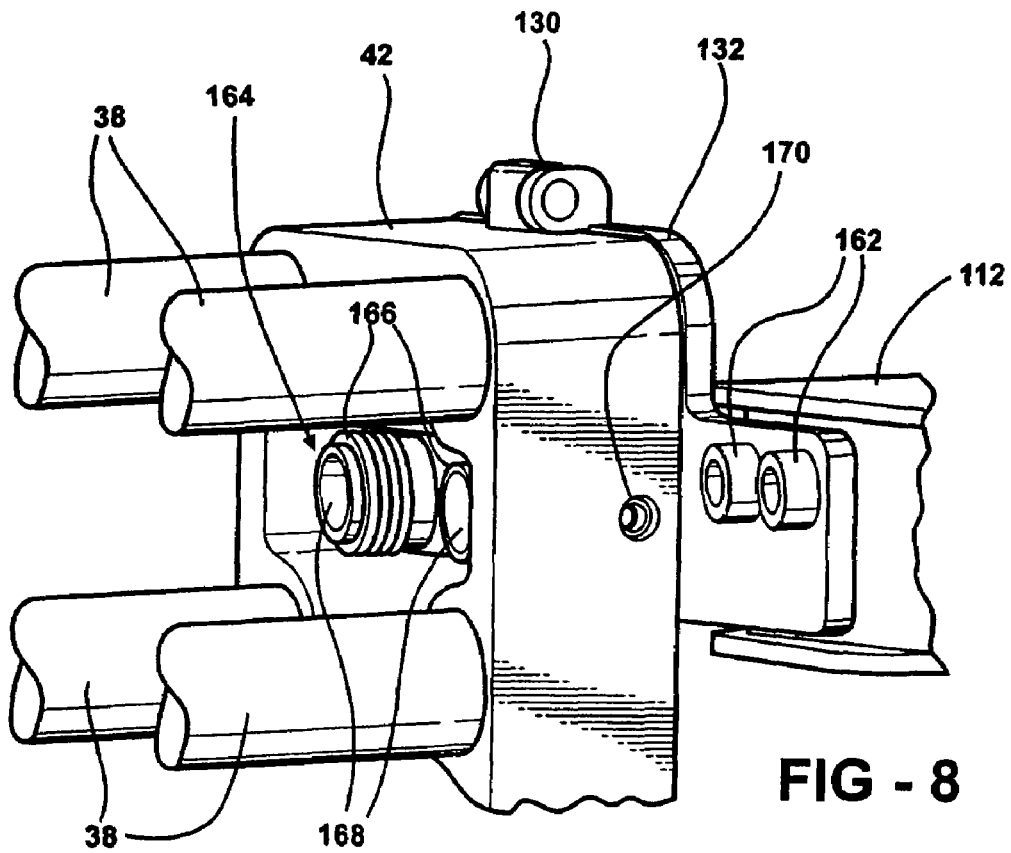
FIG. 8 is a partial perspective view of the pedal hinge assembly and actuating device associated therewith of the collapsible steering assembly.

Referring to FIG. 8, the bifurcated bracket 132 includes a pair of screw bosses 162 through which screws extend (not shown) for securing the bracket 132 to the mounting assembly 112. The pedal assembly 106 also includes a release mechanism 164, which has a pair of pyrotechnic bosses 166 defining chambers 168. A pyrotechnic pin 170 is disposed within the rear bracket 42 and communicates with at least one of the chambers 168. As is shown in FIG. 7, pyrotechnic devices 172 are disposed on the bosses 168. Actuating the devices 172 causes the pyrotechnic pin 170 to fire, which in turn causes the bifurcated bracket 132 to pivot away from the rear bracket 42.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A collapsible steering assembly comprising;
a stationary guide bracket for attachment to a vehicle,
a steering mechanism having a longitudinal steering mechanism axis,
a steering mechanism support including a plurality of guide rods arranged about a common collapse axis in non-parallel relationship to said steering mechanism axis and interconnecting said guide bracket and said steering mechanism and supporting said steering mechanism for axial movement along said collapse axis in response to application of a predetermined collapse force to said steering mechanisms,
a plurality of steering shear elements interconnecting said guide rods and said guide bracket for preventing movement of said steering mechanism relative to said guide bracket and shearable in response to application of the predetermined collapse force on said steering mechanism for allowing said guide rods and said steering mechanism to move relative to said guide bracket, and
wherein said guide bracket supports said guide rods in a fixed relationship to one another and wherein each of said guide rods comprise a steering tube extending from a front end to a rear end.

2. An assembly as set forth in claim 1 wherein said guide rods are straight.

3. An assembly as set forth in claim 1 wherein each of said steering shear elements comprises a bushing surrounding each guide rod and engaging said guide bracket.

4. An assembly as set forth in claim 1 wherein said guide bracket includes a front bracket interconnecting said front ends of said guide rods and a rear bracket supporting said rear ends of said guide rods.

5. An assembly as set forth in claim 4 wherein said guide rods comprise four tubes spaced from one another in a quadrangle.

6. An assembly as set forth in claim 4 wherein said rear bracket includes a connector for attachment to the vehicle.

7. An assembly as set forth in claim 4 wherein said rear ends of said guide rods extend through said rear bracket.

8. An assembly as set forth in claim 4 including a pedal assembly pivotally connected to said rear bracket for permitting pivotal movement of said pedal assembly in response to movement of said guide rods relative to said rear bracket.

9. An assembly as set forth in claim 4 and including a knee bolster for absorbing impact energy during a crash condition, a plurality of bolster guide rods arranged about a second collapse axis and interconnecting said guide bracket and said knee bolster and supporting said knee bolster for axial movement along said second collapse axis in response to application of a second predetermined collapse force to said knee bolster.

10. An assembly according to claim 9 and including a plurality of bolster shear elements interconnecting said bolster guide rods and said guide bracket for preventing movement of said knee bolster relative to said guide bracket and shearable in response to application of a second predetermined collapse force to said knee bolster for allowing said bolster guide rods and said knee bolster to move relative to said guide bracket.

11. An assembly according to claim 10 wherein said guide bracket supports said bolster guide rods in fixed relationship to one another.

12. An assembly according to claim 11 wherein said bolster guide rods are straight.

13. An assembly according to claim 12 wherein each of said bolster guide rods comprises a tube.

14. An assembly as set forth in claim 13 wherein each of said bolster shear elements comprises a bushing surrounding each of said bolster tubes and engaging said guide bracket.

15. An assembly as set forth in claim 13 wherein said bolster tubes comprise four tubes spaced from one another in a quadrangle.

16. An assembly as set forth in claim 13 wherein said bolster tubes have front and rear ends and, said knee bolster connected to said front ends of said bolster tubes and said rear bracket supporting said rear ends of said bolster tubes, said knee bolster and said rear bracket being spaced from and on opposite sides of said guide bracket.

17. An assembly as set forth in claim 16 wherein said guide bracket includes an upper block having bores therethrough with said guide rods extending through said bores and a lower block having bores therethrough with said bolster tubes extending through said bores in said lower block.

18. An assembly as set forth in claim 17 including a second plurality of steering shear elements interconnecting said rear bracket and said guide rods for preventing movement of said guide rods relative to said rear bracket and shearable in response to application of the predetermined collapse force to the steering mechanism for allowing said guide rods to move through said rear bracket.

19. An assembly as set forth in claim 13 including an energy absorber system for absorbing energy during movement of at least one of said steering mechanism and said knee bolster relative to said guide bracket.

20. An assembly as set forth in claim 19 wherein said guide bracket includes an upper block and said energy absorber system includes a first anvil-strap device interconnecting said guide rods and said upper block.

21. An assembly as set forth in claim 20 wherein said bolster tubes are parallel to said guide rods.

* * * * *